(No Model.) 2 Sheets—Sheet 1.

A. K. DRESHER.
ELECTRIC SWITCH.

No. 557,777. Patented Apr. 7, 1896.

WITNESSES:
Edward Thorpe
G. M. Hopkins

INVENTOR
A. K. Dresher
BY
Munn & Co
ATTORNEYS.

(No Model.) 2 Sheets—Sheet 2.

A. K. DRESHER.
ELECTRIC SWITCH.

No. 557,777. Patented Apr. 7, 1896.

WITNESSES:
Edward Thorpe
G. M. Hopkins

INVENTOR
A. K. Dresher
BY
Munn & Co.
ATTORNEYS.

UNITED STATES PATENT OFFICE.

ABRAHAM K. DRESHER, OF WORCESTER, PENNSYLVANIA.

ELECTRIC SWITCH.

SPECIFICATION forming part of Letters Patent No. 557,777, dated April 7, 1896.

Application filed April 24, 1895. Serial No. 546,992. (No model.)

*To all whom it may concern:*

Be it known that I, ABRAHAM K. DRESHER, of Worcester, in the county of Montgomery and State of Pennsylvania, have invented a new and Improved Electric Switch, of which the following is a full, clear, and exact description.

The object of my invention is to construct a switch in which the space intervening between the stationary and movable contact-surfaces will be great when the switch is open and small when the switch is to be closed, so that the switch may make a long break and a short make.
The object is also to provide an automatically-adjustable contact-spring and a binding-post of peculiar construction for holding the contact-spring and receiving the conducting-wire.
My invention consists in the combination of a recessed base-piece of insulating material, a plate of spring material placed in the recess and provided with two or more upwardly-inclined spring-arms furnished with inwardly-turned projections at their free ends, an arbor journaled in the base and provided with a finger-piece and with wedge-shaped cams for engaging the springs in the recess, a disk of insulating material placed loosely on the arbor and provided with two studs of different length for engaging the curved springs, a spring carried by the arbor and connected with the disk thereon, angled contact plate or plates carried by the disk, and one or more pairs of contact-springs attached to the base and lying in the path of the angled contact-plates, all as will be hereinafter more fully described, and pointed out in the claims.
Reference is to be had to the accompanying drawings, forming a part of this specification, in which similar letters of reference indicate corresponding parts in all the views.

Figure 1:
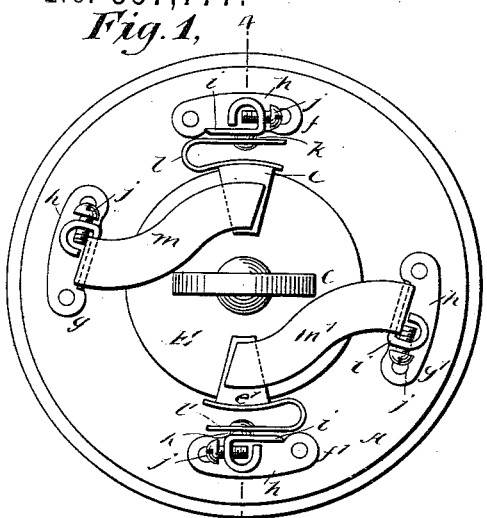
Figure 2:
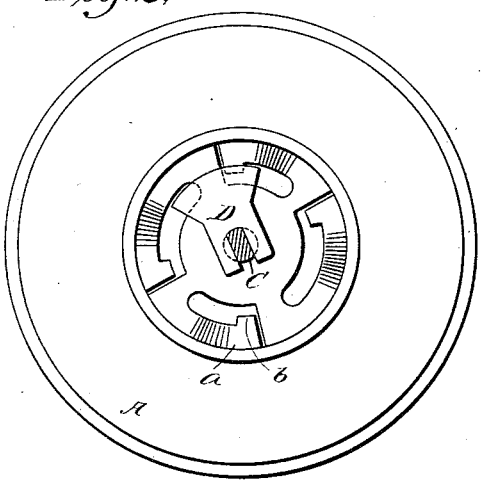
Figure 3:
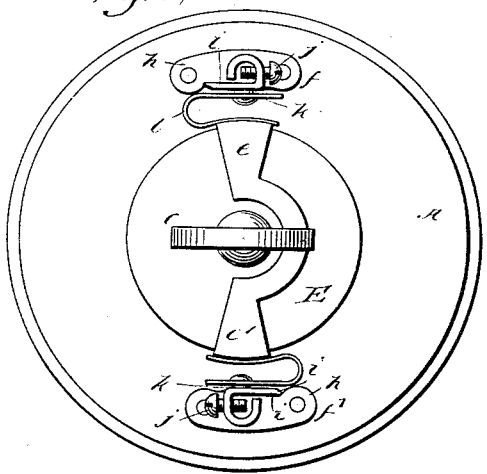
Figure 4:
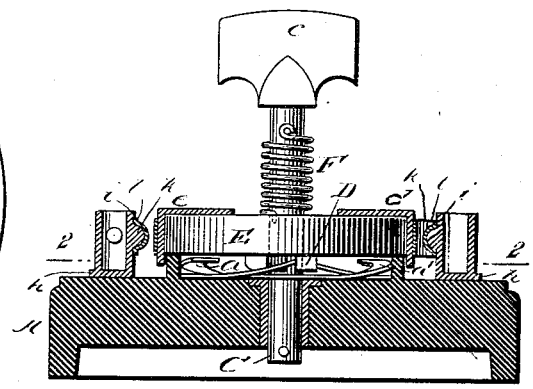
Figure 5:
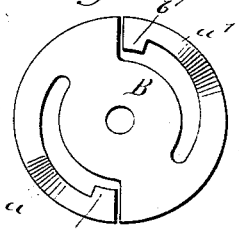
Figure 8:
Figure 6:
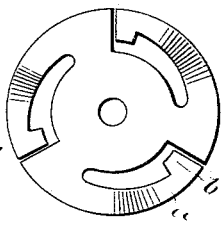
Figure 9:
Figure 7:
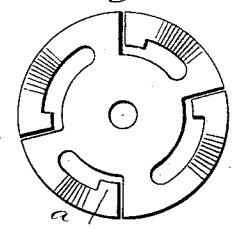
Figure 7:
Figure 10:
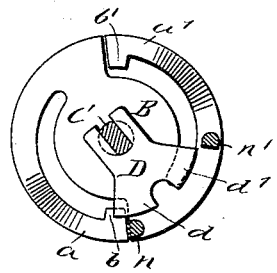
Figure 12:
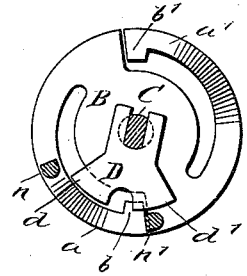
Figure 11:
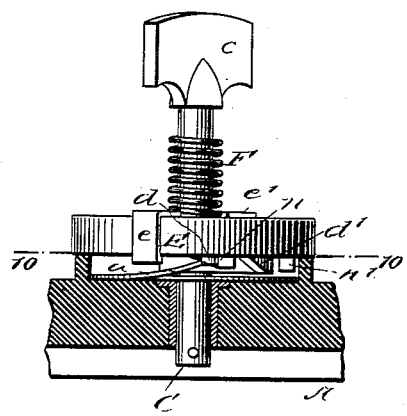
Figure 13:
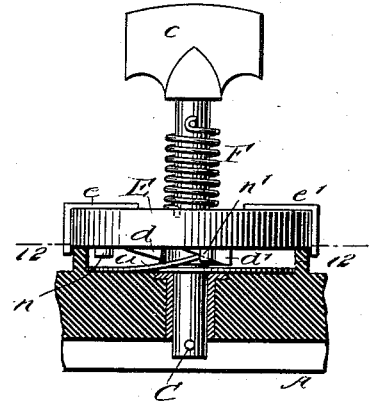
Figure 14:
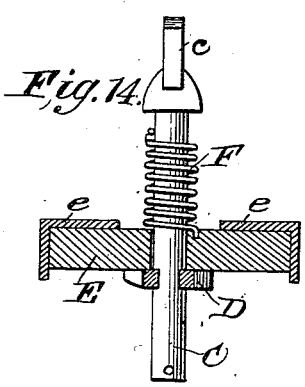

Figure 1 is a plan view of my improved switch with the cover removed. Fig. 2 is a horizontal section of the switch, the section being taken on the line 2 2 in Fig. 4. Fig. 3 is a plan view of a switch for a single wire. Fig. 4 is a vertical transverse section taken on line 4 4 in Fig. 1. Fig. 5 is a detail plan view of a spring-plate for a double escapement-switch. Fig. 6 is a plan view of a spring-plate for three escapements. Fig. 7 is a plan view of a similar plate for four escapements. Fig. 8 shows a plan view and a side elevation of the double wedge-cam. Fig. 9 shows a plan view and a side elevation of a single wedge-cam. Fig. 10 is a horizontal section on line 10 10 in Fig. 11. Fig. 11 is a side elevation of the escapement-springs, the spindle and the disk carried thereby, showing the position of the parts when the switch is open. Fig. 12 is a horizontal section on line 12 12 in Fig. 11; and Fig. 13 is a side elevation of the escapement-springs, the spindle and the disk carried thereby, showing the position of the parts when the switch is closed. Fig. 14 is a vertical transverse section of the revolving portion of the switch.

The base A, which is formed of insulating material, is chambered on its under surface, and the central portion of its upper surface is recessed to receive the escapement-spring plate B, the said plate being provided with a central aperture and cut so as to form the spring-arms $a$ $a'$, the said arms being curved upwardly at their free ends and provided with projections $b$ $b'$, which extend inwardly toward the center of the plate. In the center of the base A is journaled an arbor C, provided at its upper end with a finger-piece $c$ and carrying a wedge-cam D, upon which are formed two wedges $d$ $d'$, the wedge $d'$ being thicker at its larger end than the wedge $d$. The said wedges $d$ $d'$ are capable of engaging the projections $b$ $b'$ of the spring-arms $a$ $a'$.

On the arbor C above the wedge-cam D is loosely placed a disk E, of insulating material, and above the said disk on the arbor C is placed a spiral spring F, the upper end of which is bent and attached to a projection on the arbor, while the lower end thereof is connected with the disk E. On the top and outer edge of the said disk are placed angled plates $e$ $e'$, of conducting material, which extend along the upper surface of the disk E toward the arbor C and reach across the periphery of the disk. These contact-plates may form the terminals of a main body-plate extending across the disk E, as shown in Fig. 3.

To the base A are secured the binding-posts $f$ $f'$ $g$ $g'$. These posts are formed of sheet metal bent at right angles, the part forming the foot $h$ being attached to the base by screws passing through holes in the base A and entering the foot $h$. The part $i$ of the binding-post, which extends upwardly from the foot $h$ at right angles, is slit along a line near the base A and curved over upon its side, forming a receptacle for the end of a wire which projects upwardly through a hole in the base and a hole in the foot $h$. The curved-over portion of the part $i$ is drilled and tapped to receive the screw $j$, which serves to bind the wire. In the binding-posts $f f'$ the straight portion of the part $i$ is swaged outwardly, forming a hemispherical projection $k$, which fits an impression of corresponding shape in the looped contact-springs $l\,l'$, inserted between the posts $f f'$ and the disk E. The spring is held in place by the hemispherical projection $k$ and pressed against the plate $e$ with sufficient friction to make the electrical contact. To the posts $g\,g'$ are attached curved contact-springs $m\,m'$, which extend over the top of the disk E in the path of the contact-plates $e\,e'$. In the disk E are inserted studs $n\,n'$, which project downwardly into a recess in the top of the base A, where they are engaged by the spring-arms $a\,a'$. The stud $n'$ is longer than the stud $n$.

The spring-arms $a\,a'$, the studs $n\,n'$, and the wedges $d\,d'$ form an escapement, by means of which the disk E is allowed to escape and turn forward under the pressure of the spring F. The first movement of the arbor when turned brings the spring $f$ under tension, one or the other of the studs being in engagement with one of the springs. When one of the springs is in engagement with the shorter stud $n$, the position of the disk E and contact-plates $e\,e'$ relative to the contact-springs is that of an open circuit, and the small wedge $d$ is in front of the projection $b$ or $b'$, as the case may be, and is held there by the spring, as shown in Figs. 10 and 11. The thinner wedge-cam $d$ is about to engage the projection $b$ of the spring $a$. When the cam $d$ is brought into engagement with the projection $b$, the spring $a$, when pressed down, releases the short stud $n$ and allows the spring on the arbor C to turn the disk E and bring the contact-pieces $e\,e'$ into contact with the springs $l\,l'\,m\,m'$, thereby completing the circuit. At the same time the longer stud $n'$ strikes the end of the spring $a$, so that the disk E in closing the circuit has moved only the distance between the studs $n\,n'$. When it is desired to interrupt the circuit, the arbor C is again turned in the same direction, the wedge-cam $d$ being prevented from retrograde motion by engagement with the projection $b$. This forward movement of the arbor C brings the thicker wedge-cam $d'$ into engagement with the projection $b$ of the spring $a$ and forces the spring down sufficiently to allow the longer stud $n'$ to escape, when the spring F on the arbor C, being under tension, turns the disk E until the short stud $n$ strikes the end of the spring $a'$, this movement of the disk E carrying the contact-pieces $e\,e'$ out of contact with the springs $l\,l'\,m\,m'$, breaking the circuit.

The distance through which the disk E moves in breaking the circuit is thus made greater than the distance through which it moves in closing the circuit. What has just been described takes place in connection with the spring $a'$.

By making the movement necessary to complete the circuit small it is made possible to make the movement for breaking the circuit larger, thus avoiding arcs.

When the arbor C is turned by means of the finger-piece $c$, the smaller wedge $d$ is carried forward, engaging the projection of the spring-arm $a$ or $a'$, forcing the spring downward and liberating the disk E, which is quickly moved forward by the spring F, bringing the contact-plates $e$ and $e'$ into contact with the springs $l\,l'\,m\,m'$, thus completing the circuit through the switch. As the circuit is completed, the longer stud $n'$ comes into contact with the spring-arm $a$ or $a'$. When the arbor C is again turned, the larger wedge $d'$ is brought into engagement with the spring which holds the stud $n'$, while the spring F is again put under increased tension. The stud $n'$ is liberated and the spring F causes the plates $e\,e'$ to be thrown out of contact with the springs $m\,m'\,l\,l'$, thereby opening the circuit.

It is obvious that I may use a single stud $n$ or $n'$ and that I may operate the switch by means of a single wedge-cam. (Shown in Fig. 9.) It is also obvious that I may increase the number of escapements by increasing the number of arms on the spring-plate B, as shown in Figs. 6 and 7. Therefore I do not limit or confine myself to the exact form herein shown and described.

Having thus described my invention, I claim as new and desire to secure by Letters Patent—

1. In an electric switch, the combination of the contact-carrying disk provided with long and short studs, the spindle carrying the disk, the spring attached to the spindle and to the disk, the base in which the spindle is journaled, spring-arms attached to the base and adapted to engage the long and short studs of the disk, and wedge-cams carried by the spindle and adapted to engage the spring-arms, substantially as specified.

2. The combination with the recessed base, of two or more spring-arms formed integrally with a base-plate and provided with projections extending inwardly toward the center of the base-plate, a spindle, and wedge-cams carried thereby for engaging the projections of the spring-arms, the spring-pressed disk placed loosely on the spindle and provided with studs for engaging the spring-arms, contact-pieces carried by the disk, the spring connecting the spindle and the disk, and contact-springs attached to the base, as herein specified.

3. In an electric switch, the combination with fixed contacts of a spring-pressed revoluble disk carrying contacts and provided with long and short studs, a spindle supporting the disk and provided with thick and thin wedge-cams, and spring-arms attached to the base and constructed for engagement by the wedge-cams, substantially as specified.

4. In an electric switch, a binding-post formed of a single piece of metal bent at right angles, the horizontal member forming a foot for the post, and the vertical member having one end disconnected from the horizontal member and curved over and against the other end of the said vertical member, forming an open-ended receptacle, substantially as described.

5. In an electric switch, the mechanism for causing a long break and short make, formed of a long and short spring and wedge-cams, as herein specified.

ABRAHAM K. DRESHER.

Witnesses:
JOHN S. HUBNY,
CHAS. E. FOULKE.